United States Patent [19]

Hiraoka et al.

[11] 4,218,228

[45] Aug. 19, 1980

[54] EXHAUST GAS PURIFYING DEVICE

[75] Inventors: Suguru Hiraoka; Yasuyuki Sakuraya; Yoshinobu Haneda, all of Tokyo, Japan

[73] Assignee: Hoei Industry Co., Ltd., Tokyo, Japan

[21] Appl. No.: 934,283

[22] Filed: Aug. 16, 1978

[30] Foreign Application Priority Data

Apr. 27, 1978 [JP] Japan .............................. 53-55245[U]

[51] Int. Cl.² ........................................... B01D 50/00
[52] U.S. Cl. ....................................... 55/319; 55/396; 55/455; 55/DIG. 30; 60/311
[58] Field of Search ...................... 55/276, 319, 385 B, 55/394, 396, 426, 452, 455, 457, DIG. 20, DIG. 21, DIG. 30; 60/311; 110/119, 226; 181/231

[56] References Cited

U.S. PATENT DOCUMENTS

| | | | |
|---|---|---|---|
| 429,347 | 6/1890 | Haskell | 55/457 |
| 2,511,190 | 6/1950 | Wright | 55/276 |
| 2,732,026 | 1/1956 | Folts | 55/DIG. 30 |
| 3,545,179 | 12/1970 | Nelson et al. | 55/455 |
| 3,677,364 | 7/1972 | Pawlina | 55/276 |
| 3,898,064 | 8/1975 | Tao et al. | 55/276 |
| 3,957,471 | 5/1976 | Tamachi et al. | 55/396 |

FOREIGN PATENT DOCUMENTS 276502  4/1913  Fed. Rep. of Germany ............. 55/457

*Primary Examiner*—David L. Lacey
*Attorney, Agent, or Firm*—Sughrue, Rothwell, Mion, Zinn and Macpeak

[57] ABSTRACT

An exhaust gas purifying device for removing harmful solid particles, sparks and flames contained in exhaust gas discharged from an internal combustion engine comprises a cylindrical body member connected to a muffler in an exhaust gas system of the engine. The cylindrical body member is separated into front and rear chambers by an intermediate partition plate. The front chamber includes an exhaust gas introducing hole in a front wall thereof and displaced with respect to a communicating hole formed in the central portion of the partition plate to thereby effectively remove the harmful particles at low flow rate of the exhaust gas. The rear chamber includes a swirl-generating means on the upstream side thereof and a solid particle collecting chamber on the outer periphery thereof to thereby remove the harmful particles at high flow rates of the exhaust gas.

5 Claims, 3 Drawing Figures

EXHAUST GAS PURIFYING DEVICE

BACKGROUND OF THE INVENTION

This invention relates to an exhaust gas purifying device installed in an exhaust gas system of an internal combustion engine for removing dusts, solid particles or the like. The exhaust gas purifying device of the invention is especially useful in an engine such as a motor cycle engine in which the range of exhaust gas flow rates is relatively wide.

If solid particles in the form of spark or engine flames are discharged from an exhaust gas system of an internal combustion engine into the atmosphere, not only is the environment contaminated but, in a place where the combustible or ignitable materials exist, such as a gasoline station, an accidental fire is liable to be caused. This is very dangerous. In view of this matter, the exhaust gas containing the solid particles from the exhaust pipe is limited under some vehicle laws, and an exhaust gas purifying device as well as a muffler is typically used in the exhaust gas system of a vehicle.

A conventional exhaust gas purifying device will now be described. The exhaust gas purifying device comprises a hollow cylindrical member installed in an exhaust gas system and swirl-generating means having a plurality of spiral vanes which are provided on the upstream side of the hollow cylindrical member. In operation, the introducing gas is swirled by the swirl-generating means in the cylindrical member, and solid particles are moved or collected toward an inner wall of the cylindrical member by the centrifugal force, as a result of which floating particles are removed. This manner has been widely used as a so-called centrifugal-force particle removing method.

However, in the above-described method, if the swirling motion or speed is low, the exhaust gas purifying effect is scarcely obtained. Therefore, the conventional exhaust gas purifying device has a disadvantage that the effective exhaust gas purifying effect cannot be obtained in low load conditions of an engine wherein the amount of the exhaust gas is small. In a motorcycle engine having a wide range of exhaust gas amounts, such a disadvantage is remarkable.

A further problem in conventional exhaust gas purification devices is that the capacity for solid particle storage is relatively low in relation to the size of the device. This is particularly troublesome in vehicles such as motorcycles in which it is desirable to maintain vehicle weight and size as low as possible.

SUMMARY OF THE INVENTION

Accordingly, it is an object of the present invention to provide an exhaust gas purifying device which will operate satisfactorily at low and intermediate exhaust gas flow rates as well as high flow rates.

It is a further object of the present invention to provide an exhaust gas purifying device having an increased capacity for solid particle storage.

Briefly, this is accomplished by including in a centrifugal separating device a front chamber which acts as an expansion chamber at low load conditions so that solid particles are separated by gravity. The inlet and outlet openings of the front chamber are offset so that, at intermediate exhaust flow rates, the solid particles will strike the rear wall of the front chamber and be separated from the exhaust gas flow. The centrifugal separation chamber is provided only with a single solid particle removal slit and the slit is disposed at the top of the centrifugal separation chamber so that substantially the entire chamber may be used for solid particle storage.

DETAILED DESCRIPTION OF THE INVENTION

Figure 1:
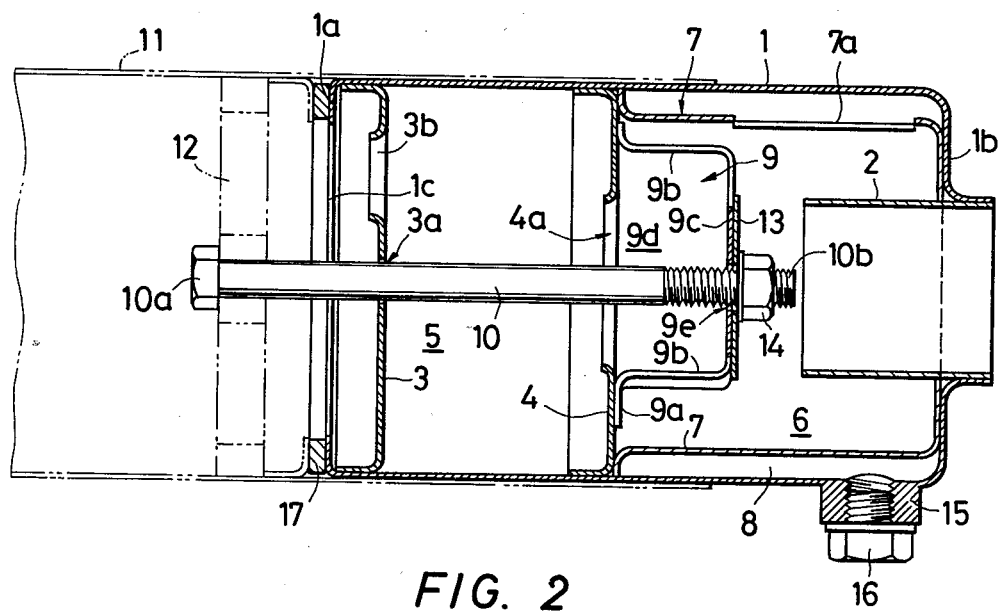
FIG. 1 shows a cross sectional view of an exhaust gas purifying device according to the present invention.
Figure 2:
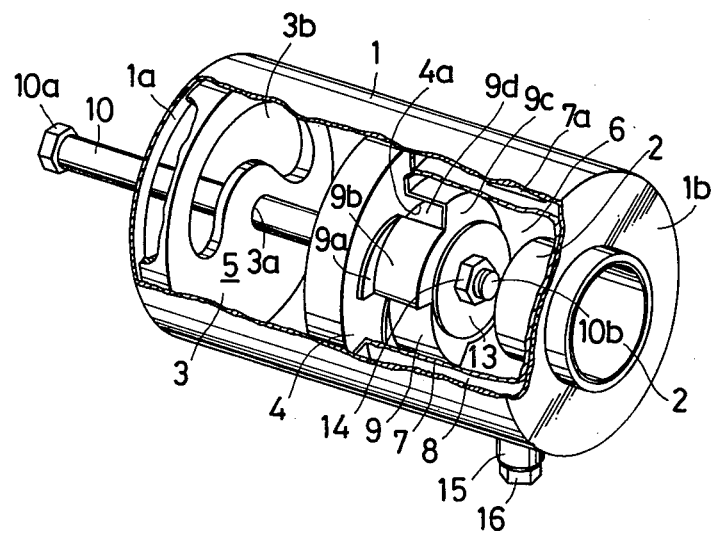
FIG. 2 shows a perspective view partially cut away, of the device shown in FIG. 1.

The present invention will be hereinafter described in detail in reference to the accompanying drawings. In one specific embodiment shown in FIGS. 1 and 2, an exhaust gas purifying device consists mainly of a cylindrical member 1. An annular bent portion 1a is formed at the front end of the cylindrical member 1 so that the cylindrical member 1 has a large hole 1c. An exhaust gas discharging conduit 2 having a large diameter extends through a hole of a rear plate 1b. A cup-shaped front partition plate 3 and a cup-shaped intermediate partition plate 4 are weldingly connected to the inner surface of the cylindrical member 1 just after the annular bent portion 1a and at the intermediate portion of the cylindrical member 1, respectively, to thereby form a front chamber 5 and a rear chamber 6. An arc- or crescent-shaped gas introducing hole 3b is formed in the upper portion of the front partition plate 3 and a circular hole 3a is formed in the central portion of the same partition plate for piercing it with a long bolt 10 which will be described later. A gas communicating circular hole 4a is formed in the central portion of the intermediate partition plate 4 so that the gas communicating hole 4a is displaced with respect to the gas introducing hole 3b in a longitudinal cross section of the cylindrical member 1. The rear chamber 6 is formed into a dual wall construction by an inner sleeve member 7 and at the same time one slit 7a for passing solid particles is formed in the longitudinal direction, through which the rear chamber 6 communicates with a solid particle collecting chamber 8. A screw 16 is in threaded engagement with a solid particle discharging outlet 15 formed in the cylindrical member 1. The gas communicating hole 4a is covered by a substantially cup-shaped swirl-generating means 9 on the rear side thereof. The swirl-generating means 9 is constructed of a plurality of flange portions 9a which are weldingly cemented to the intermediate partition plate 4, a plurality of spaced spiral vanes 9b each having an arcuate surface and a back impinging plate 9c to thereby form swirl flow projecting outlets 9d which are directed radially outwardly.

The aforementioned long bolt 10 extends from an outlet partition wall 12 of a muffler 11 through the hole 3a of the front partition plate 3 and a hole 9e of the back plate 9c to the rear chamber 6. The front head 10a of the bolt 10 is fixed to the outlet partition wall 12 of the muffler 11 and the rear threaded portion 10b thereof to the back plate 9c through a washer 13 by a nut 14. As is apparent from the foregoing construction, the cylindrical member 1 can be sealingly assembled integrally with the muffler 11 through a packing 17 therebetween by screwing the nut 14 while inserting the bolt 10 into the partition wall 12 of the muffler 11. Such assembling and dismounting are very easy. It will, of course, be recognized that the bolt 10 would be unnecessary if the purifying device were somewhere other than at the end of the exhaust system, for example upstream of the muffler 11.

In operation, the exhaust gas having decreased pressure and muffled sounds in the muffler 11 is discharged, in order from the upstream to the downstream, through the gas introducing hole 3b, the front chamber 5, the gas communicating hole 4a, outlets 9d of the swirl-generating means 9 the rear chamber and finally gas discharging conduit 2 to the atmosphere.

In the above process, the floating solid particles are removed through a two-stage effect of the front and rear chambers.

(a) GRAVITY AND INERTIA PARTICLE REMOVAL (effect of front chamber)

When the gas flow rate is low, the solid particles are dropped and piled on the bottom portion of the front chamber 5 by self-gravity due to pressure drop and speed reduction of the gas introduced from the gas introducing hole 3b. At an intermediate exhaust gas flow rate, the introduced gas is impinged on the upper half of the intermediate partition plate 4 by the inertia force so that the solid particles contained in the gas are collected and removed.

(b) CENTRIFUGAL FORCE PARTICLE REMOVAL (effect of rear chamber)

At high speed of the gas flow, the gas flow introduced from the swirl flow-projecting outlets 9d to the rear chamber becomes strong swirl, and is passed through the rear chamber 6 in the form of spirals and then exhausted from the gas discharging conduit 2. Therefore, solid particles contained therein are collected along the inner surface of the inner sleeve member 7 and are thereafter deposited in the solid particle-collecting chamber 8 through the slit 7a.

The collected or piled solid particles in the chambers 8 and 5 are removed by dismounting the screw 16 through the discharging outlet 15 and by loosening the nut 14 and drawing the cylindrical member 1 from the muffler 11. These operations are readily achieved.

As mentioned above, according to the present invention the exhaust gas purifying is effectively carried out even in the low flow rate region of the exhaust gas, and the solid particle collecting characteristic can be maintained well over a wide range of exhaust gas rates by the inertia and self-gravity particle removals and the centrifugal force particle removal which is effective in the high flow rate region of the introduced exhaust gas. Further, by providing only a single solid particle collection slit 7a disposed near the top of the solid particle collecting chamber, substantially the entire solid particle collection chamber can be used to store the removed particles.

Figure 3:
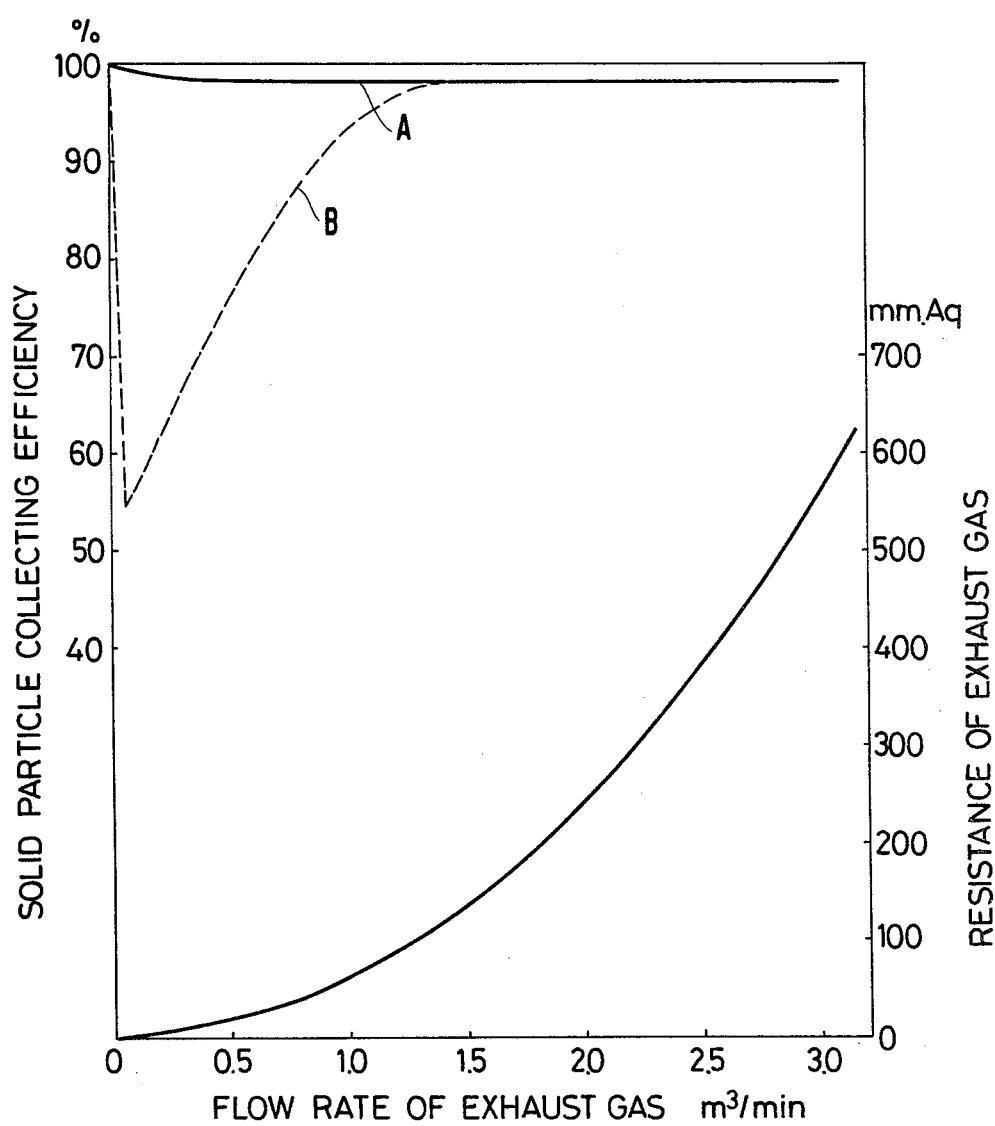
FIG. 3 shows a solid particle-collecting characteristic graph of the device shown in FIGS. 1 And 2 versus that of a prior art device having a single chamber.

The experimental data will be illustrated in reference with FIG. 3 showing graphs of the particle collecting characteristics for a particle collection device having only a single rear chamber (line B) or both front and rear chambers as in the present invention (line A). For a device having both front and rear chambers as in the present invention, the particle collecting efficiency of approximately 100% is obtained over the range from 0 to 3 m³/min of the flow rate of the exhaust gas. In comparison, for a device in which no front chamber is provided, the lower particle collection efficiency for an exhaust gas having a flow rate from 0 to 1.5 M³/mm is completely overcome.

As described above, according to an exhaust gas purifying device of the present invention, the front chamber between the exhaust gas introducing hole and the gas communicating hole is provided upstream of the rear chamber, the latter having a centrifugal force particle removing effect, to thereby attain a satisfactory particle removing effect even in the low speed or flow rate region of the exhaust gas due to the self-gravity particle removal. Therefore, over the wide range of the flow rate of the exhaust gas, the exhaust purifying effect is greatly improved by the present invention. In addition, the solid particle storage capacity of the device is significantly increased by providing only a single solid particle collection slit disposed at the top of the centrifugal separation chamber.

What is claimed is:

1. An exhaust gas purifying device for an internal combustion engine, comprising:
   a main cylindrical member including a front plate having an exhaust gas introducing opening therein for receiving exhaust gas from said engine and a rear plate having an exhaust gas discharging outlet therein for discharging purified exhaust gas, the space defined by the inner surface of said cylindrical member and said front and rear plates comprising an inner chamber,
   a partition plate separating said inner chamber into a front chamber between said front plate and said partition plate and a rear chamber between said rear plate and said partition plate said partition plate having a communicating hole which is displaced with respect to said exhaust gas introducing opening,
   swirl-generating means disposed in said rear chamber just after the partition plate, and
   an inner sleeve member in the rear chamber between said swirl generating means and the inner surface of said cylindrical member so as to form a dual wall construction, said inner sleeve member forming, in conjunction with said inner surface a solid particle collecting chamber and having only one solid particle passing slit disposed at the top of the inner sleeve member.

2. An exhaust gas purifying device as recited in claim 1, wherein said exhaust gas introducing opening is positioned in the upper half portion of said front plate and said communicating hole is formed in the central portion of said partition plate whereby at low flow rates of the exhaust gas, the harmful solid particles are separated from the exhaust gas and are piled or collected on the lower bottom portion of the front chamber.

3. An exhaust gas purifying device as recited in claim 2, wherein said exhaust gas introducing opening is substantially crescent-shape.

4. An exhaust gas purifying device as recited in claim 1, wherein said swirl-generating means further comprises a plurality of flange portions weldingly cemented to the rear surface of the partition plate, a plurality of spaced spiral vanes each having an arcuate surface and a back impinging plate to thereby generate swirl flows directed radially outwardly whereby at high flow rates of the exhaust has, the harmful solid particles are collected in said particle collecting chamber through the solid particle passing slit.

5. An exhaust gas purifying device as recited in claim 1 further comprising collecting particle discharging means at the bottom of said collecting chamber.

* * * * *